United States Patent [19]
Efford

[11] Patent Number: 4,751,331
[45] Date of Patent: Jun. 14, 1988

[54] CONTROL OF YELLOW COLOR IN POLYETHER POLYOLS

[75] Inventor: Elizabeth A. Efford, Pittsburg, Calif.

[73] Assignee: The Dow Chemical Company, Midland, Mich.

[21] Appl. No.: 45,971

[22] Filed: May 1, 1987

[51] Int. Cl.$^4$ .............................................. C08G 65/30
[52] U.S. Cl. ................................... 568/621; 568/606; 568/609; 568/611; 568/617; 568/620
[58] Field of Search ............... 568/621, 606, 609, 611, 568/617, 620

[56] References Cited

U.S. PATENT DOCUMENTS

| | | | |
|---|---|---|---|
| 3,585,229 | 6/1971 | Christian et al. | 560/333 |
| 3,925,319 | 12/1975 | Hiatt et al. | 528/76 |
| 4,337,369 | 6/1982 | Vanderpool et al. | 568/756 |
| 4,356,330 | 10/1982 | Cuscurida et al. | 568/756 |

*Primary Examiner*—John Kight
*Assistant Examiner*—S. A. Acquah

[57] ABSTRACT

Polyether polyols are decolorized by heating to a temperature in excess of 95° C. in the presence of water and air. The resulting polyols have minimal residual color, and can be used to prepare polyurethanes having low color.

12 Claims, No Drawings

CONTROL OF YELLOW COLOR IN POLYETHER POLYOLS

BACKGROUND OF THE INVENTION

This invention relates to the decolorization and dewatering of polyether polyols.

Polyether polyols are well known raw materials for the preparation of polyurethanes. One problem associated with commercially available polyether polyols is that they tend to be somewhat yellow in color. For most applications, this is not a significant drawback, but in a growing number of applications, the cosmetic attributes of the polyurethane are a significant factor. For these applications, it is desired that the polyurethane be as colorless (white) as possible. Accordingly, it is necessary that the polyether polyol used in making the polyurethane be water-white if possible.

Various antioxidant and preservatives have been used in attempts to reduce the yellow color of the polyether polyols. However, these have the drawbacks of inadequate performance and being relatively expensive. In addition, the polyol, and therefore the polyurethane made therefrom, will contain residual quantities of these antioxidants and preservatives, which in certain circumstances could leach out, contaminating its surroundings.

Accordingly, an improved process by which a polyether polyol can be decolorized would be highly desirable.

SUMMARY OF THE INVENTION

In one aspect, this invention is a process for decolorizing a polyether polyol having a yellow color, comprising heating the polyether polyol to a temperature between about 95° C. and the decomposition temperature of the polyether polyol in the presence of water and air for a period sufficient to measurably reduce the color of the polyether polyol.

In another aspect, this invention is a process for dewatering a polyether polyol having a yellow color, comprising the steps of (A) heating the polyether polyol to a temperature between about 95° C. and the decomposition temperature of the polyether polyol in the presence of air for a time sufficient to measurably reduce the color of the polyether polyol, and then (B) heating the polyether polyol under vacuum under conditions such that the water content of the polyether polyol is reduced.

Surprisingly, the process of this invention provides a fast, simple and effective method for reducing the color of a polyether polyol. Upon cooling, the polyether polyol retains its white color. Polyurethanes prepared from the polyether polyol also have less color, due to the whiteness of the polyether polyol.

DETAILED DESCRIPTION OF THE INVENTION

The polyether polyol used in this invention is a polymer of one or more polymerizable cyclic ethers such as, for example $\alpha,\beta$-alkylene oxides; substituted $\alpha,\beta$-alkylene oxides such as styrene oxide; tetrahydrofuran, and the like. Preferably, the polyether polyol is a polymer of a $C_2$–$C_6$ $\alpha,\beta$-alkylene oxide, more preferably of ethylene oxide and/or propylene oxide. The equivalent weight of the polyether polyol is not especially critical, but is preferably from about 200 to about 5000, more preferably from about 500 to about 3000. For use in making polyurethanes, the polyether polyol advantageously has an average functionality from about 1.5 to about 8, more preferably about 1.8 to about 3. The most preferred polyether polyol is a 800–2200 equivalent weight poly(propylene oxide) having a functionality from about 1.8 to about 3, which may be end-capped with up 25%, based on the total weight of the polymer, of ethylene oxide.

The polyether polyol is advantageously prepared by heating the cyclic ether in the presence of a suitable catalyst and an initiator compound. The initiator compound a compound having a plurality of active hydrogen atoms which react with the cyclic ether in a ring-opening reaction. Compounds containing a plurality of hydroxyl, mercaptan, carboxylic acid and/or secondary amine groups are examplary initiators. Suitable initiator compounds are disclosed in U.S. Pat. No. 4,495,081, incorporated herein by reference. Preferred initiators include alkylene glycols such as ethylene glycol, propylene glycol and 1,4-butane diol, glycerine, trimethylolpropane, low molecular weight polyfunctional polyethers, alkylene diamines, sugars such as sucrose and sorbitol, bisphenols, alkanolamines, and the like.

Catalysts which are useful for the polymerization of cyclic ethers include alkali metal salts, alkaline earth metal salts, tertiary amine compounds and the like. For the preparation of low equivalent weight polyether polyols, the tertiary amine catalysts are preferred. For the preparation of high equivalent weight polyether polyol, the metallic salts or mixtures thereof with a tertiary amine compound are preferred.

Suitable tertiary amine catalysts include, for example, trialkyl amines such as trimethyl amine, triethyl amine, triisopropyl amine, dimethylisopropyl amine, dimethylethyl amine, diethylmethyl amine, dimethyldodecyl amine, dimethyltetradecyl amine, dimethylhexyl amine, dimethyloctyl amine and the like; aromatic amines such as triphenyl amine, tribenzyl amine, dimethyphenyl amine, dimethylbenzyl amine and the like; cyclic amines such as N-alkyl morpholine, N-alkyl pyridine, N,N-dialkyl pyrizine, N,N-dialkyl piperazine, N,N,N-trialkyl triazine, and N-alkyl quinoline; polyalkylenepolyamines such as triethylene diamine and tetraethylene triamine, and tertiary amine-containing polymers such as a halomethylated linear or crosslinked polystyrene which is reacted with a secondary amine to form pendant tertiary amine groups thereon. Exemplary of the last mentioned tertiary amine compound is a weak base anion exchange resin based on a styrene-divinylbenzene copolymer, of the gel or macroporous type.

Suitable metallic catalysts include the alkali metal and alkaline earth hydroxides, and metallic salts, particularly alkali metal and alkaline earth metal salts or organic acids, such as calcium naphthenate. Most preferred are the alkali metal hydroxides, especially sodium hydroxide and potassium hydroxide.

Processes for preparing polyether polyols from cyclic ethers are taught, for example, in U.S. Pat. Nos. 2,902,478, 3,040,076, 3,317,508, 3,341,599 and 3,445,525, all of which are incorporated be reference. In general, such processes involve heating the cyclic ether in the presence of the initiator and catalyst to a temperature from about 80° to about 180° C. under superatmospheric pressure. Following the polymerization, removal of unreacted cyclic ethers, byproducts and residual catalysts is normally performed. Exemplary processes for removing such substances are taught in U.S. Pat. Nos.

3,388,169, 3,715,402, 4,029,879, 4,122,035 and 4,137,398, all incorporated herein by reference.

According to this invention, the polyether polyol is decolorized by heating it in the presence of water and air to a temperature of at least about 100° C. but below the decomposition temperature of the polyether polyol. Advantageously, at least about 0.1, preferably at least about 0.015, more preferably at least about 0.02, parts by weight water are present per 100 parts by weight of the polyether polyol. Such amounts of water are typically present in a polyether polyol as it is obtained from its manufacturing process before dewatering. In addition, a polyether polyol which has been exposed to a high humidity environment often absorbs such amounts of water from the atmosphere. In such instances, no additional water need be added to the polyether polyol in order to carry out the process of this invention.

Although there is no theoretical upper limit to the amount of water which may be present, the benefits of this invention are achieved using relatively small quantities of water, and greater amounts thereof do not improve the process and cause additional problems of subsequent removal. Accordingly, it is preferred that less than about 50, more preferably less than about 10, most preferably less than about 5 parts of water are present per 100 parts by weight polyether polyol.

The polyether polyol is heated to the required temperature for a time sufficient to measurably reduce its color. The time required will vary somewhat according to the amount of polyethr polyol being decolorized, the amount of water and air used, and similar factors, but a period of 1 minute to 5 hours, preferably about 3 minutes to 1 hour, more preferably about 5 to about 30 minutes is generally sufficient to significantly reduce the color of the polyether polyol.

Following the decolorization of the polyether polyol, it may be dewatered by heating it under a vacuum to evaporate the remaining water. The temperature and vacuum used in the dewatering process are not especially critical, and can be varied in conjunction with one another to achieve a desirable rate of water removal. However, if the polyether polyol is cooled after decolorization, it should be heated to 100° C. or higher in the presence of air before a vacuum is applied to dewater it, in order to prevent the re-appearance of yellow color. A temperature between 100° C. and the decomposition temperature of the polyether polyol is advantageously used, and a temperatuire of about 100° to about 150° C. is preferred. A vacumm of about 0.1 to about 100, preferably about 0.5 to about 10 Torr is suitable. Dewatering is advantageously continued until the water content of the polyether polyol is less than about 0.5, preferably less than about 0.1 percent of the weight of the polyether polyol.

The polyether polyol which is decolorized according to this invention is useful in any application for which polyether polyols are known to be useful. It is particularly useful for applications where a white polyurethane product is desired. Such applications include films, slabstock foams, and elasatomers for medicial applications. One especially significant application for the polyether polyol is the preparation of segmented thermoplastic polyurethanes as disclosed in U.S. Pat. No. 4,621,113, incorporated herein by reference.

The following examples are provided to illustrate the invention, but are not intended to limit the scope thereof. All parts and percentages are by weight unless otherwise indicated.

EXAMPLE 1

Into a 500-ml. 3-neck flask is placed a quantity of a 1965 molecular weight, nominally difunctional ethylene oxide-capped poly(propylene oxide) which contains a small quantity of dissolved water. The polyol is heated to about 150° C. while open to the atmosphere. The polyol rapidly decolorizes to become a water-white liquid.

This experiment is repeated, except this time the polyol is heated to 100° C. The polyol becomes water-white in less than 30 minutes. A second repeat of this experiment, this time heating the polyol to 135° C., decolorizes the polyol in less than 10 minutes.

For comparision, 1.5 grams of Irgonox 1010, a commercially available stabilizer, is added to 175.62 g of the polyether polyol. This mixture is heated to 135° C. under a vacuum of 1 Torr for 3 hours. At the conclusion of this period, the polyether polyol maintains a distinct yellow color.

EXAMPLE 2

A 1000-gram portion of the polyether polyol described in Example 1 is dewatered by heating under vacuum for 80 minutes at 135° C. After dewatering, the polyol is yellow. The vacuum is released, and 5 ml of deionized water are added to the hot polyol. In less than 5 minutes, the polyol is water-white. The vacuum is then resumed to dewater the polyol. After dewatering, the vacuum is released, and the polyol is permitted to stand overnight. The polyol remains water-white.

A prepolymer made by reacting the decolorized polyether polyol with an excess of isophorone diisocyanate is nearly colorless, as is a polyurethane prepared from this prepolymer and a glycol chain extender.

EXAMPLE 3

In order to obtain a quantitative measurement of the reduction in color, the yellow index of the polyether polyol described in Example 1 is measured before coloring and again after heating the wet polyol at 100° C. for one hour while open to the atmosphere. The yellow index is measured using a Gardner colorimeter. In a first test, the yellow index is measured using a open aperture to set the zero point. Using this test, the yellow index is seen to decrease from 16.07 to 7.36, or by 8.71 units, when the polyol is treated according to the invention. When a black disc is used to set the zero point, the yellow index is seen to decrease from 16.15 to 7.94, or by 8.21 units, after treatment according to the invention. When deionized water is used to set the zero point, the yellow index is seen to decrease from 12.85 to 4.62, or 8.23 units, after treatment according to the invention.

What is claimed is:

1. A process for decolorizing a polyether polyol having a yellow color, comprising heating the polyether polyol to a temperature between about 95° C. and the decomposition temperature of the polyether polyol in the presence of water and air for a period sufficient to measurably reduce the color of the polyether polyol.

2. The process of claim 1 wherein the temperature is from about 95° to about 150° C.

3. The process of claim 2 wherein the polyether polyol contains at least about 0.1 weight percent water.

4. The process of claim 2 wherein the polyether polyol is a polymer of propylene oxide having a functionality of about 1.8 to about 3 and an equivalent weight from about 200 to about 5000.

5. The process of claim 2 wherein the polyether polyol is an ethylene oxide-capped poly(propylene oxide) having an equivalent weight from about 800 to about 1800.

6. A process for dewatering a polyether polyol having a yellow color, comprising the steps of
(A) heating the polyether polyol to a temperature between about 95° C. and the decomposition temperature of the polyether polyol in the presence of air for a time sufficient to measurably reduce the color of the polyether polyol, and then
(B) heating the polyether polyol under vacuum under conditions such that the water content of the polyether polyol is reduced.

7. The process of claim 6 wherein the temperature in step (A) is from about 95° to about 150° C., and step (B) is conducted at a temperature from about 100° to about 150° C.

8. The process of claim 7 wherein the polyether polyol contains at least about 0.1 weight percent water.

9. The process of claim 8 wherein the polyether polyol is a polymer of propylene oxide having a functionality of about 1.8 to about 3 and a equivalent weight from about 200 to about 5000.

10. The process of claim 9 wherein the polyether polyol is an ethylene oxide-capped poly(propylene oxide) having an equivalent weight from about 800 to about 1800.

11. A polyether polyol which is decolorized according to the process of claim 1.

12. A polyether polyol which is decolorized and dewatered according to the process of claim 6.

* * * * *